United States Patent [19]

Habuda, Sr. et al.

[11] 4,019,705
[45] Apr. 26, 1977

[54] PIPE HANGING APPARATUS

[76] Inventors: Blair A. Habuda, Sr., 1890 Woodlawn Ave., Youngstown, Ohio 44514; Anthony Kopatich, 742 Whipple Ave., Campbell, Ohio 44405

[22] Filed: Apr. 5, 1972

[21] Appl. No.: 241,342

[52] U.S. Cl. .................................. 248/58; 248/72; 248/228

[51] Int. Cl.² .......................................... F16L 3/00

[58] Field of Search ............... 248/72, 70, 58, 59, 248/228, 327, 317, 62, 342, 55, 226 A; 403/11, 14

[56] References Cited

UNITED STATES PATENTS

| 497,512 | 5/1893 | Beaton | 248/62 |
|---|---|---|---|
| 2,502,272 | 3/1950 | Patton | 248/226 A |
| 2,593,222 | 4/1952 | Tracy | 248/226 A |
| 2,826,385 | 3/1958 | Osborn | 248/74 B |
| 2,841,348 | 7/1958 | Stahlhuth | 248/65 |
| 2,996,274 | 8/1961 | Marik et al. | 248/62 |
| 3,004,745 | 10/1961 | Wilson | 248/349 |
| 3,288,415 | 11/1966 | Eickhoff | 248/226 A |
| 3,321,161 | 5/1967 | Hirt | 248/72 |
| 3,353,775 | 11/1967 | Sebo | 248/70 |
| 3,427,656 | 2/1969 | Miller | 248/55 X |
| 3,572,623 | 3/1971 | Lapp | 248/72 |
| 3,623,686 | 11/1971 | Dupuis | 248/70 X |
| 3,687,407 | 8/1972 | Dickerson | 248/59 |

*Primary Examiner*—Roy D. Frazier
*Assistant Examiner*—Rodney H. Bonck
*Attorney, Agent, or Firm*—Hamilton, Renner & Kenner

[57] ABSTRACT

Apparatus for suspending a pipe from a structural member, such as a beam, having a projecting flange with a proximate layer of building material, wherein a beam clamp having jaws and a fastening device for holding the beam clamp on the beam flange also has a rib on the outside of one jaw extending longitudinally thereof to facilitate insertion of the jaw between the beam flange and the proximate layer of building material and to resist turning forces applied to the beam clamp. The beam clamp has a securing device in one end communicating with a tapered recess in the other end forming a guideway for a connecting rod which carries a collar for supporting the pipe. The collar has embossments to provide limited contact between the collar and the pipe to reduce resistance to rotation of the pipe, as for threading it into another pipe member.

4 Claims, 8 Drawing Figures

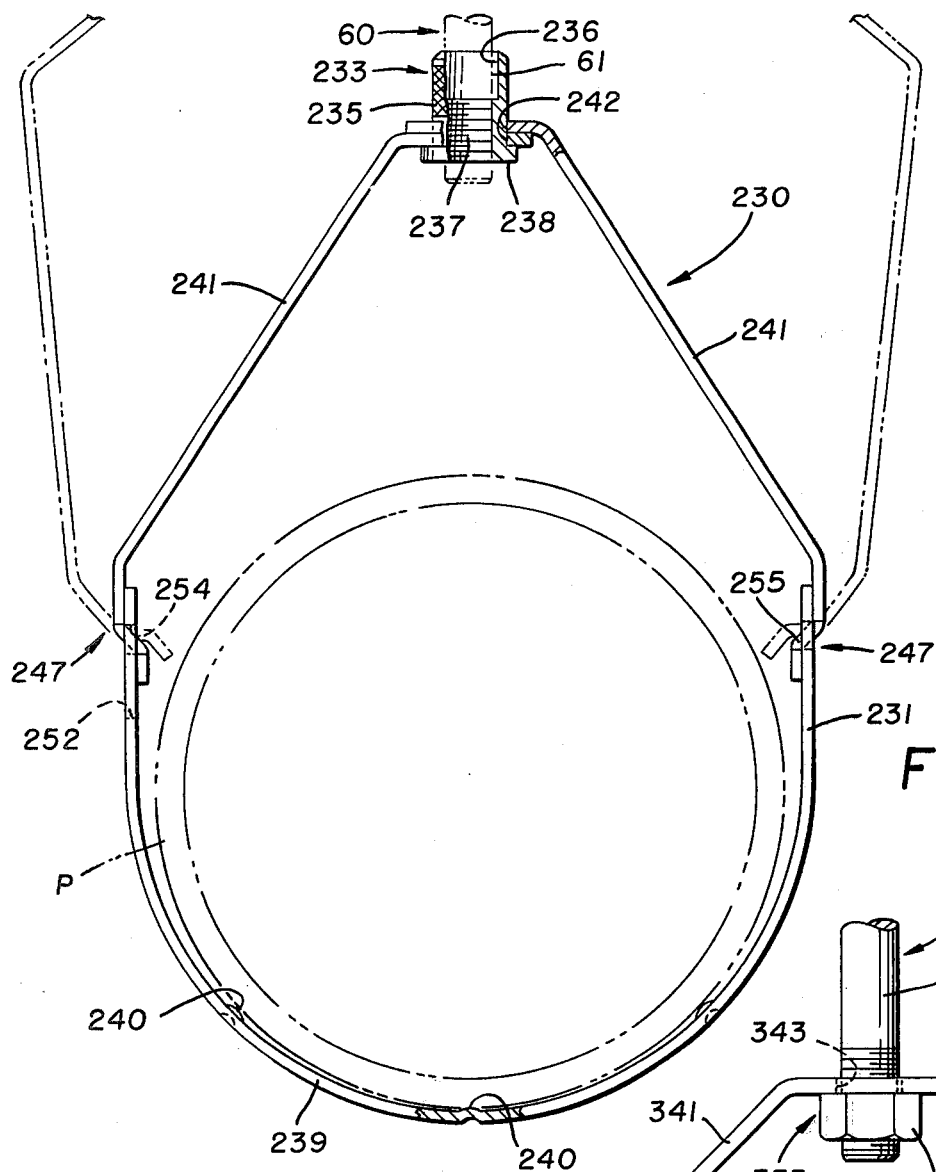
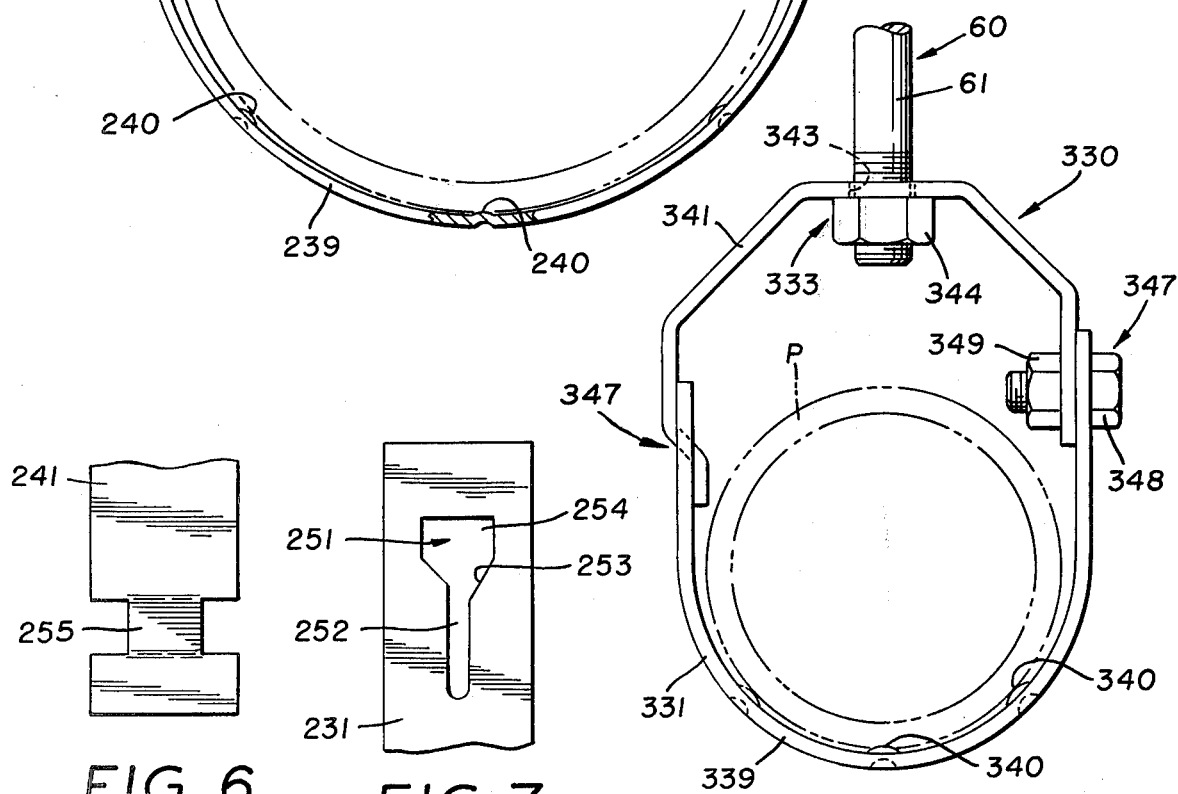
FIG. 5
FIG. 6
FIG. 7
FIG. 8

PIPE HANGING APPARATUS

BACKGROUND OF THE INVENTION

The present invention relates generally to improved pipe hanging apparatus including an improved beam clamp and more particularly to readily assembled apparatus for supporting a pipe or other conduit from a structural member such as an I-beam of the type commonly used in building construction.

Pipe hanging devices are employed most frequently in factories and commercial structures for supporting pipes from ceilings or an overhead area. In such installations of piping, the various types of pipe hanging devices are generally most conveniently secured to ceiling beams or to overhead trusses.

In recent years, there has been a vast increase in the use of pipes and conduits for the transmission of fluids, such as oil, water, and gas, and to encase electrical conductors in both industrial and domestic applications. Perhaps most common is the increased use of pipe for plumbing and for sprinkler systems to control fires. Often, components for holding or suspending these pipes within the framework of a building or proximate an outdoor truss have been prefabricated to abate increasing on site labor installation costs. However, even with these prefabricated components, assembly is often slow and laborious due at least in part to archaic design considerations.

For example, certain prior art pipe hanging devices require the insertion of a bolt extending from a collar carrying a pipe into a mating bore of a beam clamp positioned some distance away. Due to the displaced location, the poor lighting conditions often surrounding such a location, and a generally unfavorable position of an installer with respect to his work, even a simple threading operation can become a time-consuming as well as a tedious job in the absence of supporting or guiding structure. Moreover, efforts to effect quick and easy assembly of such devices are often thwarted due to the fact that insertion of the bolt may turn, twist, or otherwise displace the beam clamp out of a secure position, thereby requiring repositioning as well as retightening. Yet other prior art pipe hanging devices require the insertion of the bolt into two separate aligned bores of a beam clamp. This type of clamp often limits the adjustability of the bolt relative to the clamp without cutting the bolt since, unless the threads of the second bore are precisely coordinated with respect to the threads of the first bore, the bolt will bind or jam in the second bore. Thus, clamps of this type require acceptance of limited adjustability or the increased costs normally attendant the tapping of coordinated threads in two bores.

Some prior art devices make it difficult after assembly to visually inspect the device to insire that the bolt has been inserted a sufficient distance into the beam clamp to support the weight of the suspended pipe. Hence, what should be the relatively simple istallation and inspection of piping may require an inordinate amount of time and consequent expense.

Another time consuming factor in the installation of pipe hanging devices is that it is often necessary or desirable to rotate an already suspended pipe section, as when two pipe sections are threaded together. This operation, due to the friction between the pipe and a supporting collar may require substantial exertion by an installer, may loosen the beam clamp thus requiring repositioning and retightening or at least reinspection of the beam clamp, and may also tend to distort or deform the collar member, even to the extent of inducing failure of the collar.

SUMMARY OF THE INVENTION

It is therefore an object of the present invention to provide pipe hanging apparatus which contains or is adaptable to structure affording a great degree of flexibility with respect to the type of pipe to be installed and the building construction. Another object of the invention is to provide a pipe hanging apparatus in which a collar member is readily aligned and connected to a beam clamp with reduced possibilities of twisting or turning the beam clamp. A further object is to provide a pipe hanging apparatus which permits a pipe to be easily rotated after suspension in the apparatus without disturbing the existing placement of the components. Still another object of the invention is to provide a pipe hanging apparatus in which the extent of insertion of a connecting rod into a beam clamp is esily determined by visual inspection and in which the connection rod engages only a single threaded area in the beam clamp, whereby there can be substantial adjustment of the connecting rod relative to beam clamp.

Still a further object of the invention is to provide a pipe hanging apparatus which may be easily and quickly installed on the site even udner difficult environmental conditions. Yet another object of the invention is to provide a pipe handing apparatus which can be fabricated with a minimum amount of labor and at reasonable cost.

In general, this invention relates to pipe hanging apparatus including an improved beam clamp for supporting a pipe from the beam clamp which is attached to the flange of a structural member. The body portion of the beam clamp has a securing member which extends through an end of the body portion and communicates with a recess extending into the other end and side of the body portion. A pair of jaws generally extend outward from the body portion, with one jaw having a fastening member to engage a flange of a structural member between it and the other of the jaws for holding the clamp positioned on the structural member.

The beam clamp cooperates with a connecting rod and a collar member to support a pipe from the structural member. The collar member has an arcuate base generally conforming with the outer periphery of the pipe with at least one embossment extending therefrom and engaging the pipe to provide limited contact between the collar and the pipe. The connecting rod selectively engages a receiver member of the collar and the securing member of the beam clamp body, so that the pipe is supported in selected spaced relation from the structural member.

Figure 1:
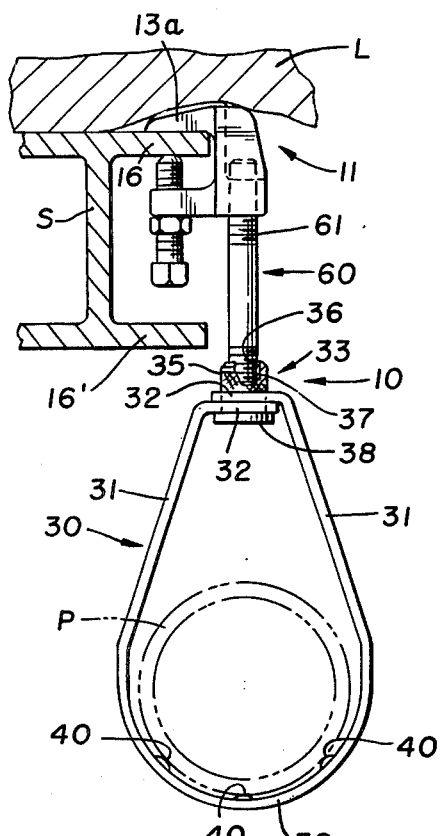
FIG. 1 is an elevational view showing a preferred form of an assembled pipe hanging apparatus according to the concepts of the present invention supporting a pipe from the flange of a structural member.
Figure 4:
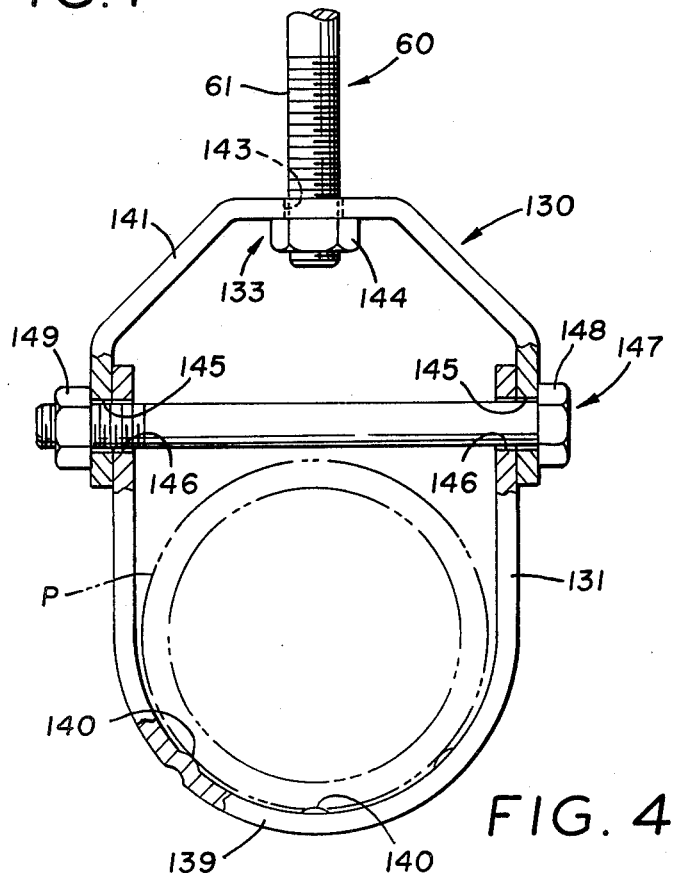

FIG. 4 is an enlarged front elevational view of the collar portion and a fragment of the connecting rod portion of the pipe hanging apparatus depicted in FIG. 1.

FIG. 5 is a front elevational view of a collar portion of a pipe hanging apparatus according to another embodiment of the present invention showing the open position of the arm members for introducing or removing a pipe in phantom lines.

FIG. 6 is a fragmentary view of FIG. 5 showing the end portion of a clevis member.

FIG. 7 is a fragmentary view of FIG. 5 showing the end portion of arm member.

FIG. 8 is a front elevational view of yet another embodiment of a collar portion.

DESCRIPTION OF THE PREFERRED EMBODIMENTS

In general, a preferred embodiment of pipe hanging apparatus according to the concept of the present invention is shown in FIG. 1, as generally indicated by the numeral 10. As shown, the pipe hanging apparatus comprises a beam clamp, generally indicated by the numeral 11, for attachment to a structural member, a collar member, generally indicated by the numeral 30, for supporting a pipe and a connecting rod, generally indicated by the numeral 60, joining the beam clamp 11 and collar member 30.

Figure 2:
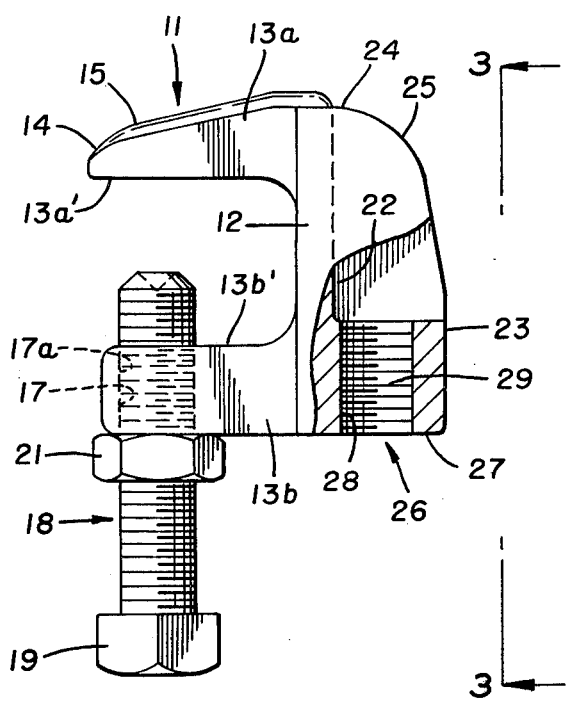
FIG. 2 is an enlarged front elevational view with a portion broken away of the beam clamp portion of the pipe hanging apparatus of the present invention showing the features thereof in greater detail.

Referring particularly to FIG. 2, the beam clamp 11 according to the concepts of the present invention has a body portion 12 and a pair of jaws 13a and 13b which generally extend outwardly from the body portion. Preferably, the jaws 13a, and 13b may be substantially parallel and have opposed surfaces 13a', 13b', jaw surface 13a' extending from substantially one end and jaw surface 13b' extending from the other end of the body portion 12. Upper jaw 13a is preferably exteriorly tapered or beveled toward its outer end as shown at the numeral 14 and has a rib or bead 15 which preferably extends substantially the length of the tapered portion of the jaw on the outside of jaw 13a, or opposite the surface 13a'. The taper 14 provides a wedging effect as when the beam clamp is driven or forced onto a substantially flat flange 16 of a structural member S such as an I-beam and beneath a proximate lower layer L of building material such as a supported roof, or floor construction. The rib 15, in addition to imparting strength to jaw 13a, reduces the frictional contact area between the top of the jaw and the layer L of the roof or floor so as to further facilitate the driving of the clamp into position over a flange 16. Moreover, the rib 15 in engaging and sometimes imbedding itself into the layer L of the roof or floor material tends to stabilize the beam clamp and prevent it from twisting or turning out of position upon the application of torsional forces as when the connecting rod 60 is attached to the clamp.

The beam clamp 11 is secured to a flange 16 of a structural member S by providing a fastening device, generally indicated by the numeral 18, which is selectively positionable with respect to jaw 13b. As shown, the fastening means is a set screw 19 which cooperatively engages a bore 17 which has internal threads 17a to position set screw 19 relative to the jaw 13a with flange 16 therebetween.

The installation of beam clamp 11 on a structural member S follows conventionally from the above described structure. As seen from FIG. 1, the jaws 13a, 13b may be place about flange 16 and the beam clamp driven into the position depicted. Set screw 19 is then rotated until it securely abuts the lower surface of flange 16. In order to maintain the secure engagement, the set screw 19 may be provided with a lock nut 21 which contacts the bottom of jaw 13b. Should it be desirable to hang the beam clamp from the lower flange of an I-beam, such as flange 16' of FIG. 1, or from any flange not contiguous to a roof, floor or the like, the entire beam clamp 11 may be inverted and lower jaw 13b placed on the upper surfacae of the lower flange 16' since set screw 19 and lock nut 21 would be readily accessible for manipulation in such a position.

Considering now the body portion 12 of beam clamp 11, spacing and joining jaws 13a, 13b, a longitudinal recess 22 extends into the body portion 12 preferably on the side 23 opposite the projecting jaws 13a, 13b and through the end 24 of body portion 12 including a curved shoulder 25. A securing member, generally indicated by the numeral 26, for selectively receiving the connecting rod 60 is located proximate an end 27 of body portion 12, opposite the end 24, and communicates with recess 24. As shown in FIG. 2, the securing member may be a bore 28 having threads 29.

A collar member, as seen in FIG. 1 and indicated by the numeral 30, may be generally an elongated clevis member 31 having ears 32 which overlap each other. The collar member 30 has a receiver device, generally indicated by the numeral 33, which selectively joins collar member 30 to the connecting rod 60. As shown, the receiver device is a cylindrical insert 35 having a bore 36 provided with threads 37 to engage connecting rod 60 and a flange 38 which engages ears 32 to support the collar member 30. A base 39 opposite ears 32 of the clevis member 31 is preferably arcuate so that it generally conforms with the outer periphery of pipe P. If desired, clevis members 31 of differing configuration, paricularly various curvatures of the base 39, may be provided to effect greater compatibility with pipes of differing diameter. Spaced along the base 39 of the clevis member 31 are embossments 40 which serve to reduce the surface area of contact between the pipe and the clevis. This permits the pipe to be rotated, as when it is being threaded to another pipe, upon the application of a smaller amount of torque or force than otherwise normally required and reduces the tendency of collar member 30 to turn or rotate with the pipe. The embossments 40 need extend only a relatively short distance inwardly of the base 39 of clevis member 31 and can be readily made in accordance with conventional forming techniques.

Adjustable joinder of the collar member 30 to the beam clamp 11 at a selected distance and in supporting relation is effected by a connecting rod, generally indicated by the numeral 60. As a matter of practice in the art, the connecting rod 60 is normally a bolt or shaft 61 which has threads at both ends or which is continuously threaded so that selected lengths may be cut as needed. One end of bolt 61 selectively engages the receiver device by threading the shaft into bore 36. The other end of bolt 61 engages the securing member 26 by threading into the bore 28, as seen in FIG. 1. As so assembled, the pipe hanging apparatus supports a pipe from a structural member as contemplated by the invention.

Figure 3:
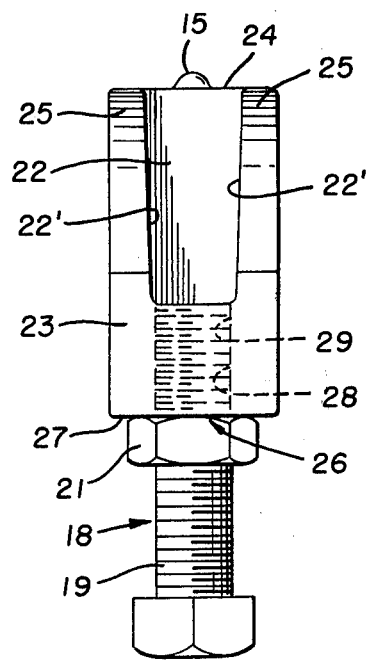
FIG. 3 is a fragmentary end elevational view of the beam clamp of FIG. 2, taken substantially on line 3—3 of FIG. 2, showing the recess in the body portion thereof.

In the assembly of the pipe hanging apparatus when the beam clamp 11 is secured to a top flange 16 of an I-beam structural member S as shown in FIG. 1, the shaft 61 of connecting rod 60 can be steadied against the lower flange 16' of the I-beam to facilitate insertion of the shaft into the beam clamp bore 28. To install the beam clamp 11 on a bottom flange 16' of an I-beam, it is oriented in an inverted position from that shown in FIG. 1, so that the longitudinal recess 24 conveniently serves as a guideway to direct the bolt 61 into beam clamp bore 28. The recess 22 may serve more effectively as a guideway if the side walls 22' are tapered, as seen in FIG. 3, so that a bolt 61 inserted all the way in recess 22 in the direction of jaws 13a and 13b is in exact alignment with the bore 28. Further, regardless of whether the beam clamp is mounted contiguous with a roof as on the top flange 16 of an I-beam as seen in FIG. 1 or free of any obstructions as on the lower flange 16' of an I-beam, it is possible to visually verify that the shaft 61 has been threaded through clamp bore 28 by viewing into recess 22 or below the end 27 of the body portion 12, respectively. This insures sufficient contact between threaded bolt 61 and the threads 29 of bore 28 to support the requisite loading.

FIG. 4 shows an alternate embodiment of a collar member according to the present invention, as generally indicated by the numeral 130. In this embodiment, the collar 130 is formed by a clevis member 131 connected to a yoke 141. A base 139 of clevis member 131 is preferably arcuate so that it generally conforms with the outer periphery of a pipe and has embossments 140 which are positioned to engage the pipe P, identical to embossments 40. The yoke member 141, which may generally have the shape of an inverted U, has an aperture 143 adapted to receive a shaft 61 of a connecting rod 60. A receiver device 133 in this instance may consist of a covnentional fastener such as nut 144 which is threaded to receive bolt 61. Proximate each end of yoke member 141 is an aperture 145 and a generally similar sized aperture 146 is formed proximate each end of clevis member 131.

The yoke member 141 and the clevis member 131 are connected by aligning the clevis apertures with the arm end apertures and inserting therethrough a releasable connector, generally indicated by the numeral 147, which may preferably consist of a bolt 148 and a nut 149.

Another alternate embodiment of a collar member according to the present invention is shown in FIG. 5, generally indicated by the numeral 230. As shown, collar member 230 has a clevis member 231 which has a base 239 that is preferably arcuate so that it generally conforms with the outer periphery of a pipe and has embossments 240 which are positioned to engage the pipe P, comparable to embossments 40, 140. Connected to the clevis member are two arm members 241 forming yoke like configuration, each of which have an aperture 242 proximate the point of joinder. The arms 241 may be separated to a spaced apart position as shown in chain lines in FIG. 5 for receiving a pipe P. After pipe P has been placed in the clevis member, as seen in FIG. 5, apertures 242 are aligned with each other and joined by a receiver device, generally indicated by the numeral 233. As previously discussed in conjunction with receiver device 33, the receiver 233 may be a cylindrical insert 235 having a bore 236 containing threads 237 and having a flange 238 which engages arms 241 to support the collar 230. To effect joinder of the collar 230 and beam clamp, shaft 61 of a connecting rod 60 is selectively engaged by insert 235 after it is positioned through apertures 242 in arms 241 so that flange 238 through arms 241 supports the collar 230.

A releasable connector, generally indicated by the numeral 247, which joins the clevis member 231 to the arm members 241 by what can be generally characterized as a tongue and groove joint. Specifically, the ends of the clevis member 231 have a shaped groove or slot 251, as best seen in FIG. 6, with a narrow portion 252, a tapered portion 253 and a wider portion 254. Arms 241 at the ends opposite apertures 242 have a reduced portion 255 (FIG. 7), the width of which is such that the ends of arms 241 can be inserted into slot 251 and then rotated so that reduced portion 255 resides solely within wider portion 254 of slot 251. The ends of the arm members 241 are offset, as seen in FIG. 5, to facilitate the insertion of the arms 241 into clevis slots 251 and to permit arm apertures 242 to be brought into alignment with each other.

Yet another embodiment of a collar member according to the present invention is shown in FIG. 8, generally indicated by the numeral 330. As in the previous embodiments, collar 330 is formed by a clevis member 331 connected to a yoke 341. Base 339 of the clevis is preferably arcuate so that it generally conforms with the outer periphery of a pipe and has embossments 340 which are positioned to engage the pipe P, similar to embossments 40, 140 and 240. The yoke member 141 generally may have the shape of an inverted U and has an aperture 343 adapted to receive shaft 61 of connecting rod 60. In this embodiment as in the previously discussed embodiment shown in FIG. 4, a receiver device 333 may consist of a conventional fastener such as nut 344 which is threaded to receive bolt 61.

The joinder of clevis member 331 to yoke 341 is effected through a releasable connector, generally indicated by the numeral 347, in which one end of the yoke is joined to one end of the clevis member in a manner as previously discussed in conjunction with releasable connector 147, FIG. 4, and in which the other end of the yoke is joined to the other end of the clevis member in a manner as previously discussed in conjunction with releasable connector 247, FIGS. 5–7. Thus, one connection is preferably made by using a bolt 348 and a nut 349 whereas the other connection is preferably made by using a tongue and groove joint as described in the discussion of releasable connector 247.

Thus, it should be evident that an apparatus according to the concepts of the prsent invention have been shown and described in sufficient detail to enable one skilled in the art to practice the invention. Since various modifications in detail, material and arrangements of parts are within the spirit of the invention herein disclosed and described, the scope of the invention should be limited solely by the scope of the claims.

We claim:
1. A beam clamp for connecting a projecting flange of a structural member having a proximate layer of building material and components supporting a pipe comprising, a body portion, a pair of jaw means extending outwardly from said body portion, fastening means selectively positionable with respect to one of said pair of jaw means to engage the flange of the structural member between it and the other of said pair of jaw means for holding the clamp positioned on the structural member, securing means in said body portion for engaging the components supporting a pipe, and rib means on the outside of one of said pair of jaws posi- tioned substantially longitudinally thereof to facilitate insertion of said one of said pair of jaws between the projecting flange of the structural member and the proximate layer of building material and to thereafter resist turning forces applied to the beam clamp.

2. Apparatus according to claim 1, wherein said one of said pair of jaws has an exteriorly tapered portion on which said rib means is positioned.

3. Apparatus according to claim 1, wherein recess means extends into the other end and side of said body portion to communicate with said securing means.

4. Apparatus according to claim 3, wherein said securing means is a bore and said recess means has tapered walls forming a guideway, a portion of which is aligned with said bore.

* * * * *